UNITED STATES PATENT OFFICE.

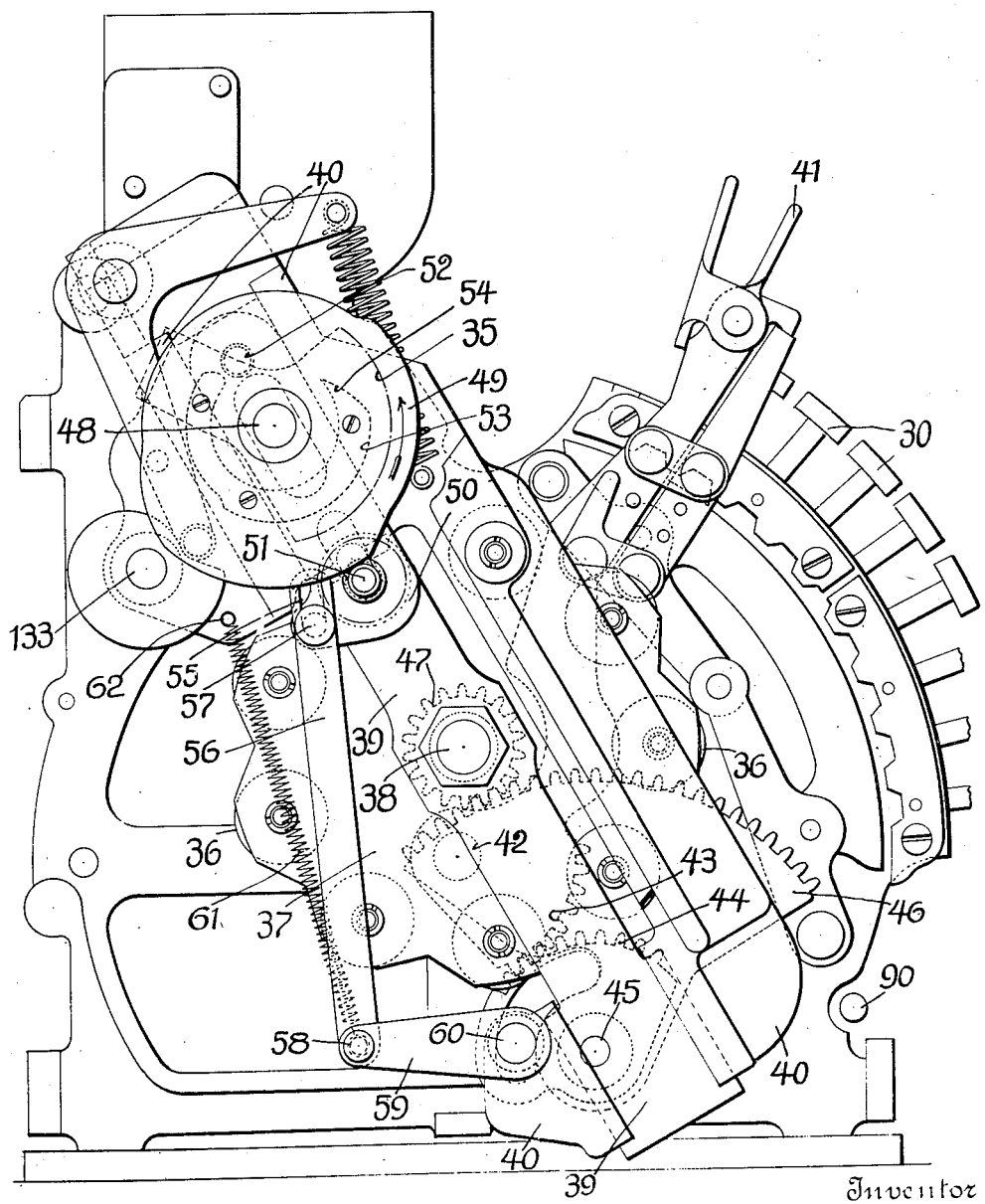

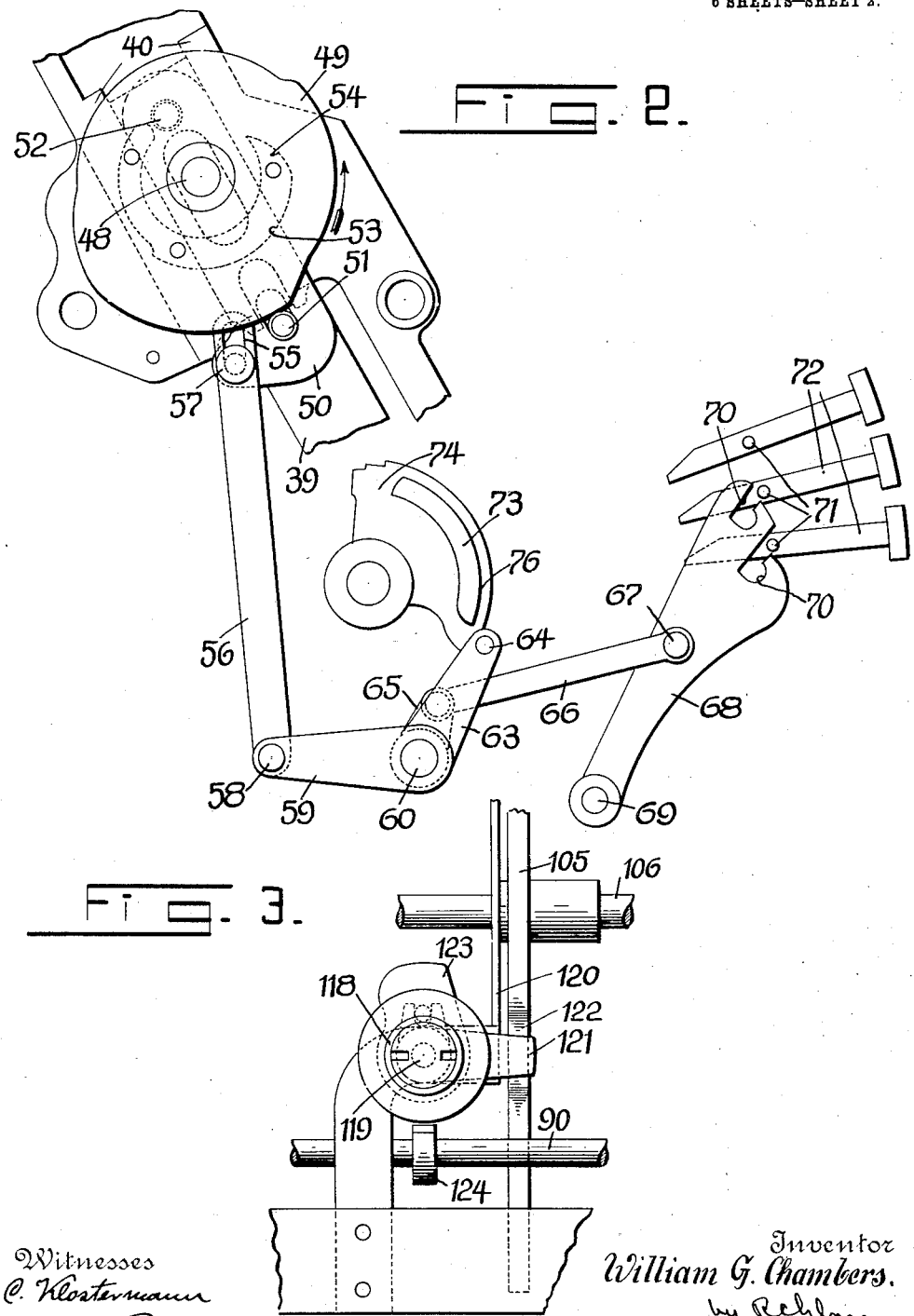

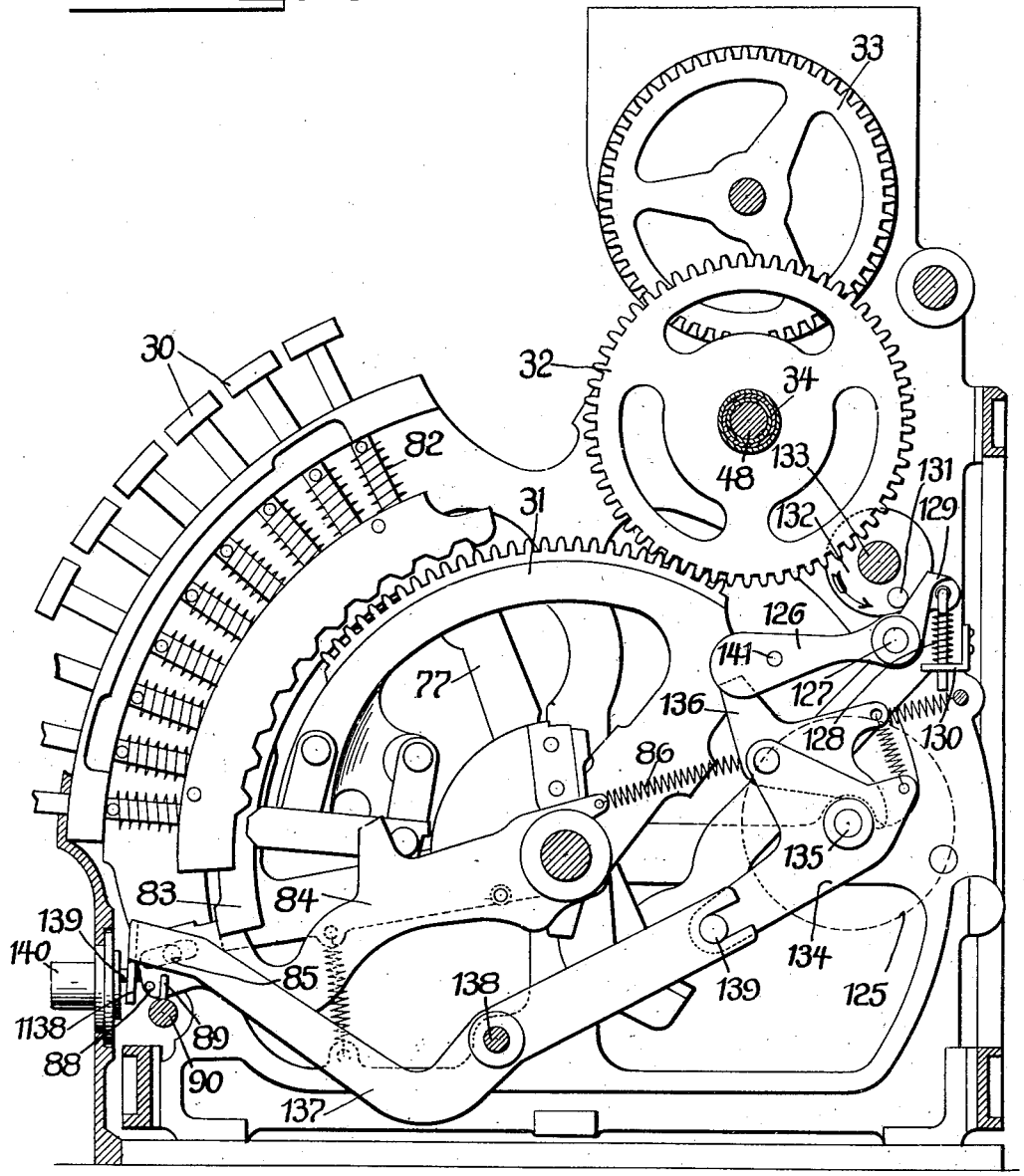

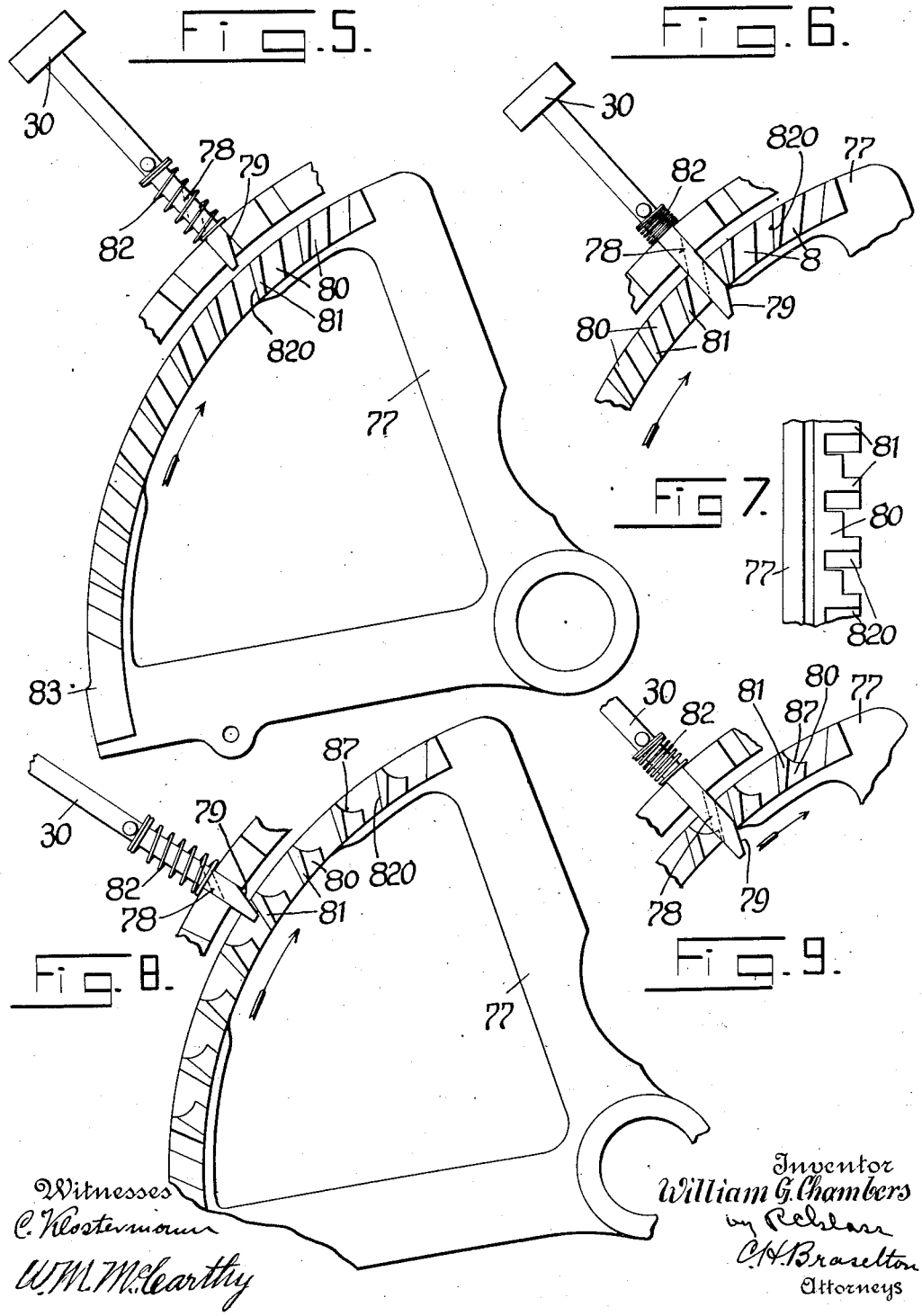

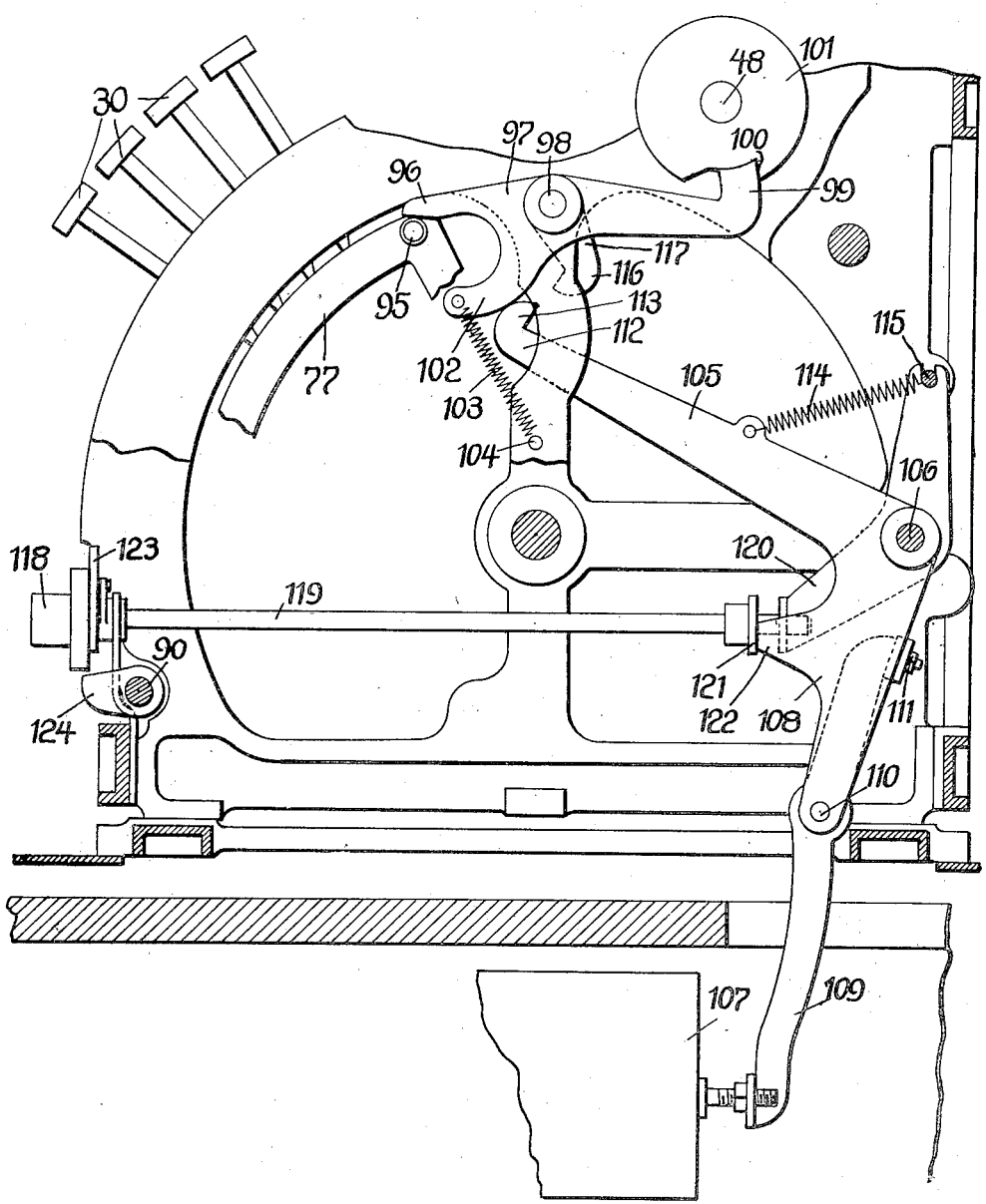

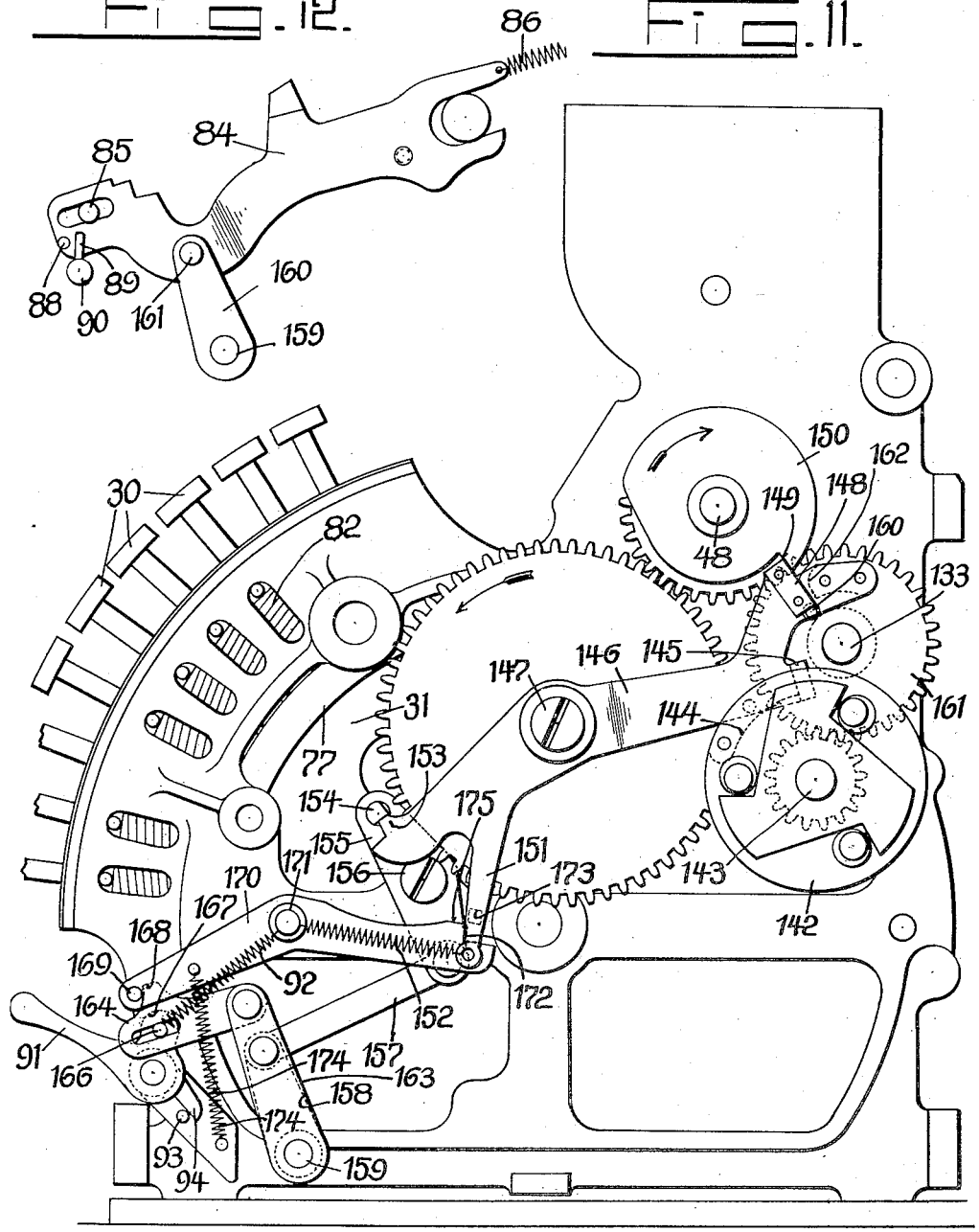

WILLIAM G. CHAMBERS, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,062,767.  Specification of Letters Patent.  Patented May 27, 1913.

Application filed August 16, 1912. Serial No. 715,324.

*To all whom it may concern:*

Be it known that I, WILLIAM G. CHAMBERS, a citizen of the United States, residing at Dayton, in the county of Montgomery and State of Ohio, have invented certain new and useful Improvements in Cash-Registers, of which I declare the following to be a full, clear, and exact description.

This invention relates to multiple cash registers and has more particular relation to machines of the type in which a plurality of totalizers are provided to enable a segregate analysis of transactions.

The principal object of the invention is to provide an improved form of mechanism for effecting the selection and actuation of any desired one of a plurality of totalizers.

The particular form of machine to which the present improvements have been shown as applied is that shown in Letters Patent of the United States issued on July 1st, 1902, to Thomas Carroll and numbered 703,639. The machine shown in that patent and as illustrated in several views of the present application, is provided with a plurality of totalizers, which totalizers are mounted in a rotatable carrier, mounted in a sliding frame. A common set of actuating racks are provided for operating any desired one of the plurality of totalizers. In the operation of the machine the rotatable carrier is first adjusted to establish a coöperative relation between any one of the totalizers and the common actuating racks, by the movement of a selecting lever. After the desired totalizer has been positioned for operation, the machine is then ready for general operation. Upon the operation of the machine the rotatable carrier, which, as before stated, is mounted in a slidable frame, is elevated so as to cause an operative engagement of the positioned totalizer with the actuating racks. Upon the completion of an actuation of the totalizer in the entry of the amount set up on the keyboard, the totalizer frame is again lowered to disengage the actuated totalizer from the actuating racks.

Various forms of mechanism have been provided for elevating and controlling the movements of the totalizer frame. In United States Letters Patent issued to R. H. Riddle on November 7th, 1905, and numbered 803,714, there is shown a form of elevating and controlling means for the rotatable carrier which permits of the disabling of the lifting means during an entry of a special transaction, such as "charge" and "paid out". As is well known in the art to which the present application pertains, when a machine of this class is put to practical use it is generally desired to have entered upon the totalizer only those amounts which represent the actual amounts in cash which are taken in on "cash" or "received on account" transactions and not upon the "charge" or "paid out" transactions. In handling the last two classes of transactions it is customary to employ mechanism for "throwing out" the totalizer so that the amount indicated and recorded will not be entered upon the totalizer. The construction shown in the Riddle patent above mentioned is very effective in performing the function for which it was originally designed, but in general use it was found that certain manufacturing problems arose which rendered it advisable to design the improved form of mechanism involved in the present application.

A further object of the present invention is to provide a new and improved form of detent mechanism operated and effective in connection with the depressible keys. As shown, and hereinafter described in connection with certain figures in the drawings of the present application, the form of detent mechanism which has been in common use on machines of the type to which the present invention has been shown as applied, while being very effective in performing the desired function, the operation of the keys was rendered quite hard. It was found that a great deal of power was required in the depression of the desired keys in registering and also the operation of the keys in the manner hereinbefore mentioned resulted in the breakage of a large number of the key springs which are used in forcing the keys out to normal position at the end of each operation of the machine, when the detents are operated to release the keys. An improved form of detent mechanism has therefore been provided which enables the depression of the amount keys by the application of a greatly decreased amount of required power and also reduces to a great extent the breakage in the key springs hereinbefore mentioned.

A further object of the invention is to provide a new form of latch for the operating mechanism of the machine which is directly controlled by the detent mechanism and thereby placed under control of the keys. In connection with this latching means there are provided devices controlled by the movements of the cash drawer whereby the machine may be adjusted to prevent an operation of a key to release the machine while the cash drawer is in open position. Devices of a similar nature have been designed for use in other machines of this character, but the form of mechanism herein shown and described as forming a part of the present invention is a decided improvement over the mechanism heretofore employed. The mechanism is rendered adjustable and is placed under control of a key controlled lock which is accessible only to the proprietor of the store in which the machine is used and whereby the mechanism just referred to may be so adjusted as to permit of the release of the machine by the depression of the keys regardless of the position of the cash drawer; or prevent the operation of the keys while the cash drawer is open; or, third, completely to lock the amount keys against depression and thereby completely lock the machine.

A further object of the invention is to provide a new and useful improvement in the alarm mechanism whereby the striking of the usual form of bell is placed under control of a key controlled lock, the adjustment of which to throw out the alarm mechanism will tend to prevent the striking of the bell by the bell hammer upon all operations of the machine subsequent to the adjustment.

A further object of the machine is to provide an improved form of motor controlled mechanism whereby the clerks' keys release the motor to actuate the machine and a further operation of the machine is prevented if an attempt is made to hold a key depressed at the completion of an operation.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings: Figure 1 is a left hand view of the machine showing setting mechanism for positioning a desired totalizer and an improved form of lifting mechanism for establishing an operative engagement between a positioned totalizer and the actuating racks. Fig. 2 is a detail view of part of the mechanism shown in Fig. 1 with the addition of certain key controlled means for disabling the operation of the totalizer frame to effect engagement of the positioned totalizer with the actuating racks therefor. Fig 3 is a detail front view of a lock for controlling the operation of the keys and machine while the drawer is open or closed as desired. Fig. 4 is a cross section of a machine of the type to which the present improvements are shown as applied and showing applied thereto the improved form of alarm mechanism and controlling means therefor. Figs. 5, 6, and 7 are detail views of detent mechanism which is old and well known in the art. Figs. 8 and 9 are detail views of an improved form of detent mechanism which forms a part of the present invention. Fig. 10 is a cross section of the machine showing the locking mechanism for the keys and operating mechanism of the machine under control of the cash drawer and the key controlled lock. Figs. 11 and 12 are views of the mechanism for controlling the operating motor and the means for preventing a second operation of the machine while the motor controlling key is held depressed.

The type of machine to which the present improvements are shown as applied is old and well known at present and machines of this type generally comprise a plurality of keys 30 which act differentially to control the adjustment of an operating member 31. The keys 30 are arranged in banks and the number of banks provided is dependent upon the registering capacity desired of the machine. It is, of course, understood that there is an operating member 31 provided for each bank of keys 30 and the members 31 act differentially to adjust the intermediate gears 32 and through the medium of said gears actuate the indicating mechanism 33. In the Carroll patent above referred to, and as shown in Fig. 4, the gears 32 are fast on the inner ends of a series of nested sleeves 34 which extend to the left hand end of the machine and carry on their outer ends a plurality of actuating rack segments 35 (see Fig. 1) adapted to actuate any desired one of a plurality of totalizers 36 carried by a rotatable frame 37 pivoted on a short shaft 38 mounted in a sliding frame 39. The frame 39 is mounted to slide in guideways 40 so as to carry the positioned totalizer into operative engagement with the actuating racks 35.

The means for placing any desired one of the totalizers 36 in coöperative relation with actuating racks 35 comprises a setting lever 41 pivoted at 42 and formed at its lower extremity with a rack segment 43 constantly in mesh with a segment 44 fast on a short shaft 45. On the shaft 45 is also rigidly mounted a segment 46 meshing with a pinion 47 fast on the carrier shaft 38. The lever 40 is capable of adjustment in any one of nine different positions as shown in Fig. 1 and through the connections just described will tend to rotate the carrier 37 to bring any desired one of the totalizers into coöperative relation with the actuating racks. The slidable frame 39 is adapted then to be elevated to establish an operative engagement between the positioned totalizer and the actuating segments by the improved form of lifting mechanism shown in Figs. 1 and 2 and which forms an important part of the present invention.

The frame 39 is slotted near its upper end to surround a rotary shaft 48 which is adapted to be given a single rotation at each operation of the machine. Fast to the shaft 48 is a cam disk 49 which acts to raise the frame 39 to effect an operative engagement between the positioned totalizer and the operating segments 35 just prior to the differential adjustment of the latter. Mounted adjacent the sliding frame 39 is a small sliding plate 50 which is slotted near its upper end to surround the shaft 48 and slotted at its lower end to surround a stud 51 carried by the frame 39. Near its upper end the slide 50 carries an anti-friction roller 52 adapted to coöperate with a camming flange 53 carried by the cam disk 49. The stud 51 carries an anti-friction roller which is adapted to coöperate with the periphery of the cam disk 49.

When the parts are in the position shown in Fig. 1 and the shaft 48 and disk 49 are rotated in the direction of the arrow shown, a bevel end 54 of the camming flange 53 will engage the under side of the roller 52 and thereby raise the plate 50 upwardly and rearwardly until the roller 52 rides on the outer surface of the camming flange 53. When the plate 50 is so elevated it will, through the medium of the slot formed therein and coöperating with the stud 51, elevate the frame 39 a like distance which is sufficient to cause an operative engagement between the positioned totalizer and the segments 35. The plate 50 and frame 39 will be held in elevated position during the operating stroke of the operating segments 35 and immediately following the completion of the operating stroke of all the segments, the frame 39 and slide 50 will be forced downwardly by reason of the engagement of a high part of the periphery of the cam disk 49 with the roller carried by the stud 51.

It will readily be seen that if it were desired to have a totalizer move into operative engagement with the operating segments at every operation of the machine, the intermediate connections comprising the roller 52 and sliding plate 50 might well be dispensed with and the cam disk 49 might then be permitted to coöperate directly with the roller on the stud 51 to elevate and depress the frame 39 at every operation of the machine. However as stated in the setting forth of the objects of the present invention, it is at times desirable to operate the machine to indicate and print an amount without recording the same upon any one of the totalizers. In order properly to indicate the complete record it is, of course, necessary to position the lever 41 and consequently the totalizer carrying frame as is well known in machines of this type. Means are provided, however, whereby during those operations when the totalizer is not to be actuated, the positioned totalizer is "thrown out" so that no addition will take place upon the same. As hereinbefore stated, this operation occurs in recording amounts appropriate to transactions such as "charge" and "paid out." It is in these operations when the elevating mechanism for the totalizer frame is not to be effective that the employment of the sliding plate 50 is rendered necessary.

The plate 50 is normally held in a position shown in Fig. 1 by reason of the engagement of the lower end of a slot 55, formed in a link 56, with a stud 57 carried by the slide 50 at its lower end. The link 56 is pivotally connected at its lower end at 58 to an arm 59 fast on a rock shaft 60. A spring 61 is provided for holding the link 56 and plate 50 in elevated position, one end of said spring being connected to the pivotal point 58 and the other end being connected to a pin 62 fast on the frame of the machine. As shown in Fig. 2 the shaft 60 extends to the right and carries near its inner end, an arm 63 carrying a pin 64 at its upper end, and also an arm 65 which is pivotally connected to the rear end of a link 66. The forward end of link 66 is pivotally connected at 67 to a plate 68 pivoted loosely upon a shaft 69 and having formed in its upper end notches 70 which coöperate with pins 71 carried by the keys 72 which are appropriate to "charge" and "paid out" transactions. When either of the keys 72 is depressed its pin 71 is adapted to engage its appropriate notch 70 and rock the plate 68 about its pivotal point 69. The rocking of the plate 68 will force the link 66 rearwardly and through the medium of the arm 65 will rock the shaft 60 in a counter-clockwise direction. When the shaft 60 is rocked in this manner, it will draw the link 56 downwardly against the tension of spring 61 and will also rock the arm 63 to cause the pin 64 carried thereby to move in the path of a flange 73 carried by an oscillating segment 74. The segment 74 is fast on the rock shaft which as before stated, is oscillated at each operation of the machine and upon the oscillation of the shaft 60 and segment 74, when the arm 63 and pin 64 have been so moved, the lower bevel end 75 of the flange 73 will engage the pin 64 and cause an additional counter-clockwise rocking movement of the shaft 60. This will cause an additional downward movement of the link 56 and through the slot and pin connection of said link 56 with the plate 50 it will tend to draw the plate 50 downward so as to cause the roller 52 to move slightly downward and out of the path of the bevel face 54 of the camming flange 53 carried by the cam disk 49. The roller 52 will then coöperate with the inner curved surface of the camming flange 53 and as said surface is concentric to the axis of rotation of the cam disk 49 the plate 50 will be held in lowered position and consequently the frame 39 will not be elevated. As soon, however, as the operation of the machine is completed, the keys 72 will spring outwardly under the action of their key springs 82 and the parts 56, 59, 60, 63, 65, 66, and 68 will be allowed to move back to normal position under the action of the spring 61, when the flange 73 will have moved out of engagement with the pin 64 to permit the restoring movement of the parts just referred to. If the machine is operated with neither of the keys 72 depressed, the pin 64 will remain in the position shown in Fig. 2. Consequently when the segment 74 is oscillated as above described, the forward surface 76 of the flange 73 will ride to the rear of the pin 64 and thereby prevent any rocking movement of the shaft 60 to disable the totalizer frame elevating means during an operation of the machine. Whenever an operation of the machine is begun with the pin 64 in the position shown in Fig. 2 the disabling mechanism will be locked against movement and therefore the totalizer frame 39 will be elevated to cause an operative engagement between the positioned totalizer and the operating segments 35. Whenever the operation of the machine is begun, however, with the pin 64 moved to the left in Fig. 2, in which moved position it will be engaged and moved still farther to the left by the flange 76, the plate 50 will be drawn downward thereby to cause the roller 52 to pass out of coöperative relation with the flange 53 and consequently the continued operation of the machine will not effect an elevation of the frame 39.

*Key detent mechanism.*—Means are provided for locking the keys 30 in depressed position while the differential adjustment of the operating members 31 is being effected. The locking mechanism for holding the keys 30 in depressed position has generally comprised a locking member 77 pivoted on the central shaft of the machine and formed on its free end in the form of an arc concentric with the arc in which the keys 30 are placed. The form of locking member 77 which is shown in Figs. 5, 6, and 7 is the form which has come into common use in machines of this type and are shown so as to bring out clearly the idea of the improved form shown in Figs. 8 and 9. As shown in Figs. 5 and 9, the keys are formed with a diagonal groove 78 and the inner end of each key is formed with the bevel face 79. The curved forward face of the member 77 is formed with lugs 80, one of which is provided for each of the keys 30 in the bank. The lugs 80 are formed with a smaller outer lug 81 for a purpose hereinafter described. The keys 30 are normally in position shown in Fig. 5 and are guided in the frame of the machine so that their inward movement is fixed and in the direct line of a radii of the arc in which the keys are placed. When any one of the keys 30 is depressed against the tension of a spring 82, the inner bevel end 79 of the key 30 will engage the face 820 of the lug 80 which is immediately in its path. The continued depression of the key 30 will cause the detent to rock about its pivot in the direction of the arrow shown until the key is forced completely into the position shown in Fig. 6. In this position the lug 80 immediately adjacent the one which was engaged by the key will have entered the slot 78 formed in the key and any continued movement of the member 77 about its pivot is prevented by the lug 81 striking against the side of the key as shown in Fig. 6. When the locking member 77 is in normal position the lower forward end 83 of said member rests in the position shown in Fig. 4 and in engagement with a notch formed in a plate 84 which is mounted to slide upon the central rock shaft of the machine and a pin 85 shown in Fig. 12 and being fast on the frame of the machine. As will be noted by reference to Fig. 4, the sliding plate 84 is formed with two shoulders near its left hand end. When a key is depressed and the member 77 is rocked upward in the manner just above described, the lower forward end 83 will be raised to an extent sufficient to clear it of the notch with which it is normally in engagement, and as soon as it is cleared of this notch a spring 86 shown in Figs. 4 and 12, tends to draw the plate 84 rearwardly until the shoulder of the second notch passes beneath the lower forward end 83 of the member 77, thus holding the member 77 in moved position during the operation of the machine. As in moved position one of the lugs 80 will be in engagement with the slot 78 formed in a depressed key, it will readily be seen that as long as the member 77 is held so elevated the key 30 will be held depressed.

It will be seen that when the member 77 is employed in the form shown in Figs. 5 and 6 it is necessary to have the inner ends of the undepressed keys clear of the lugs 80 so as to permit free movement of the member 77 when any one of the keys is depressed. Consequently in order to move the inner end of the key inwardly to an extent sufficient to bring it in a position to control the differential adjustment of the operating member 31, it will necessarily require quite a long inward depression of the desired key. During the depression of the selected key the key spring 82 will be compressed to the position shown in Fig. 6. It will readily be understood that a key spring which is repeatedly compressed to the extent shown in Fig. 6 will be greatly weakened under continued use of the machine and it has been found in practice that the spring when so depressed will frequently break after the machines have been in use only a short period of time. It has therefore been found necessary to so construct and arrange the keys 30 and the locking members 77 relative to each other as to shorten the required inward movement of the desired keys. With this idea in view the members 77 have been slightly changed by providing a curved cut away portion 87 which is formed by cutting away a small portion of the lugs 80 and 81. The keys 30 are then lengthened so that when in normal position their inner bevel ends 79 will extend beyond the extreme outer line of the curved forward surface of the locking member 77 and consequently the inward movement of the key required to bring such inner end into the position to control the differential adjustment of the operating member 31, is considerably decreased as compared with the construction shown in Fig. 5. With reference to the constructions shown in Figs. 5 and 6, it will be remembered that it was pointed out to be necessary to have the inner ends of the keys clear of the lugs 80 and 81 when the keys are not depressed. When the key is constructed as shown in Fig. 8 with the inner end of the key projecting inwardly beyond the outer curved surface of the members 77 it necessitates the cut away portion 87 so as to provide sufficient clearing to permit of the necessary elevation of the members 77 when any one of the keys is depressed. By lengthening the keys as shown in Fig. 8, as above stated, it requires a greatly decreased extent of inward movement to bring the inner end in the path of the operating member 31 and consequently the spring 82 will only be compressed to the extent shown in Fig. 9. It will readily be seen that this difference in compression of the springs 82 will tend greatly to prolong the life of said springs. It will likewise be seen that the shortening of the stroke of the keys 30 and the reduction in the compression of the springs 82 will permit of the use of a lighter spring and consequently by the use of the improved form of key detent mechanism shown in Figs. 8 and 9, the power required in depressing any desired one of the keys 30 is greatly decreased.

By the lengthening of the keys a more uniform key action is attained, as by reference to Fig. 8 it will be seen that the beveled inner end 79 of the key is in position immediately to contact with the incline wall 820 of the detent lug 80 coöperating therewith so that in connection with the use of a light spring 82 a uniform and light pressure is attained throughout the entire stroke of the key. With the old construction, as shown in Fig. 5, it will be seen that practically the first half of the stroke of the key is an idle movement, with the exception of compressing the spring, and during the last half of the stroke the extra work of rocking the detent 77 is added thereto, which requires an uneven and therefore an undesirable key pressure. To the casual operator this light and uniform key action might not appear to have very great advantages, but in establishments where all of the transactions are run through the machine by one or two operators, such for instance as would be the case in the well known and extensively used "pay cashier system" this improved key construction has advantages of great merit as it enables the clerk to operate the machine faster and with less fatigue, which advantages are in addition to those heretofore described relative to the prolonging the life of the springs.

*Key release.*—It is customary in machines of the present type to provide means whereby when a key is depressed in error the same may be released before an operation of the machine is begun. This means comprises the following constructions: It will be recalled as hereinbefore stated that when a key is depressed the detent element 77 is elevated to an extent sufficient to permit the slide or locking plate 84 to spring rearwardly thereby bringing a shoulder formed thereon beneath the lower forward end of the detent member to hold the latter elevated in locking position. It will therefore be seen that in order to release the depressed key it will be necessary to draw the plate 84 forwardly against the tension of the spring 86 thereby to permit the depressed key to spring outward under the action of its spring 82 and permitting the detent member 77 to drop down to normal position. The forward movement of the plate 84 is effected in the following manner. At its forward end each of the plates 84 carries a pin 88. Adjacent each of the pins 88 is a pin 89 mounted on a rock shaft 90 which extends across the front lower portion of the machine and has fast on its right hand end a small operating lever 91. A spring 92 normally holds the lever 91 and shaft 90 and pins 89 in the position shown in Figs. 4 and 11. A pin 93 fast on the frame of the machine normally stands in the path of a projection 94 carried by the lever 91 to limit the action of the spring 92. When it is desired to release any key which is depressed in error it is necessary merely to press down on the forward end of the lever 91 thereby rocking the shaft 90 in a counter-clockwise direction to cause the pins 89 carried thereby to engage the pins 88 mounted on the plates 84. The continued rocking movement of the shaft 90 will cause the engagement of the pins as stated to draw the plates 84 forwardly to the left as shown in Fig. 4 so as to withdraw the locking shoulder from beneath the detent member 77 thereby releasing the depressed keys in the manner hereinbefore stated.

*Machine locks.*—It is customary in machines of the present type to provide mechanism whereby the operation of the machine will be placed under the control of a bank of keys containing either the keys which are assigned to special transactions or to the various clerks operating the machine. The mechanism is generally arranged so that it will be necessary to operate some key in this bank before the machine may be operated. In Fig. 10 there are shown mechanisms for performing this function. As will be noted, the detent member 77 appropriate to the keys 30 of this particular bank carries a roller 95, near its upper end, which normally stands against one arm 96 of a three armed lever 97 fast on a short rock shaft 98 and having on its rearwardly extending arm a locking projection 99 which in the normal position of the lever 97 engages in a notch 100 formed in the disk 101 fast on the rotation shaft 48. By reason of the formation of the notch 100 in said disk 101 it will readily be seen that the shaft 48 is locked against rotation until the lever 97 is rocked about its pivot. The lever 97 has the downwardly and forwardly extending arm 102 to which is attached one end of a spring 103, the other end of which is fast to a pin 104 fast on the frame of the machine. As the locking member 77 is moved upwardly when one of the keys 30 is depressed, it will readily be seen that through the engagement of the roller 95 with the arm 96, as soon as the detent member 77 is raised, it will effect a rocking movement of the lever 97 against the tension of the spring 103 thereby withdrawing its locking projection 99 from engagement with the notch 100 of the locking disk 101. Mechanism is further provided whereby the special keys 30 just described are locked against operation while the cash drawer is in open position. In machines of this type it is customary to provide a cash drawer which is released upon each operation of the machine and forced outwardly, under the action of a spring, to expose the same for the purpose of making change or receiving the money tendered. It is desirable at times to have mechanism so arranged that it will be necessary to close the cash drawer at the end of each operation so as not to leave the money contained therein exposed between operations of the machine. The purpose of such construction is to compel an operation of the machine to make some record before access to the money contained in the drawer may be had. In order to perform this function there is provided a bell crank lever 105 pivoted at 106 to the frame of the machine and having a downwardly extending arm adapted to engage the rear end of the cash drawer 107. The downwardly extending arm of the bell crank 105 is formed in two parts 108 and 109 which are pivoted together at 110 and provided with an adjustable connection 111 so that the engagement of the cash drawer 107 with the downwardly extending arm of the bell crank may be properly timed. The bell crank 105 has a forwardly and upwardly extending arm 112 formed at its forward end with a locking hook 113. The mechanism as shown in Fig. 10 is the position which will be assumed by the same when the cash drawer 107 is locked in non-exposed position. When the cash drawer is released upon an operation of the machine and allowed to move outward to exposed position in the manner hereinbefore referred to, the bell crank lever 105 is caused to rock about its pivot 106 under the action of a spring 114, one end of which is connected to the bell crank 105 and the other end connected to the main frame at 115. When the bell crank 105 is so rocked about its pivot 106 the forward hooked end 113 of its arm 112 will move forwardly and engage a similarly formed hooked end 116 formed on a lever 117 which is fast on the rock shaft 98 which carries the locking lever 97. The bell crank lever 105 will remain in this position as long as the cash drawer remains in exposed position. Consequently it will readily be seen that the depression of the key 30 will be prevented by reason of the locking engagement of the hooks 113 and 116, as it will be recalled that when the key 30 is depressed the roller 95 carried by the locking member 77 appropriate to the depressed key will tend to rock the lever 97 and its shaft 98 in a clockwise direction. Such movement, however, is prevented by reason of the locking engagement of the two hooked portions 113 and 116. It is therefore necessary again to close the cash drawer 107 before the keys 30 just referred to may again be depressed. The closing movement of the cash drawer will cause the bell crank lever to be rocked about its pivot in a counter-clockwise direction against the action of the spring 114 thereby to disengage the hooked portion 113 from the hook 116 and releasing the shaft 98 again to permit the depression of one of the keys 30.

In certain uses of machines of this type it is often desirable to disable the mechanism just described so as to permit of an operation of the machine during rush hours without closing the cash drawer after each operation. In the performance of this function the mechanism described is placed under control of a key operated lock 118 located at the front of the machine just beneath the keyboard. The lock 118 may be of any desired form employing a detachable key which may be retained in the possession of the proprietor so as to place it solely under his control. The lock 118 is capable of three adjustments: first, to permit of an operation of the keys 30 only when the drawer is closed; second, to permit of the keys 30 being operated regardless of the position of the drawer, and, third, to entirely disable the keys. The lock 118 controls a shaft 119 which extends rearwardly in the machine and is supported at its rear end by plate 120 which is mounted on the shaft 106 and pin 115. Near its rear end the shaft 119 carries a locking arm 121 which is adapted to cooperate with the projection 122 formed on bell crank 105. In the first position of the lock as above noted, the arm 121 is above the path of the projection 122 thereby permitting a free rocking movement of the bell crank lever 105 about its pivot 106. If, however, it is desired to operate the keys regardless of the position of the cash drawer the lock 118 is adjusted to its second position thereby rotating the shaft 119 to an extent sufficient to bring the arm 121 carried thereby into the path of the projection 122. When the cash drawer is then released, the rocking movement of the bell crank 105 under the action of the spring 114 is prevented by reason of the engagement of the projection 122 with said arm 121. It will thus be seen that the shaft 98 and locking lever 97 may be rocked by the depression of a key to release the machine regardless of whether the cash drawer is in exposed or unexposed positions.

If it is desired to lock the machine against operation by disabling the keys 30, the lock is adjusted to its third position so as to bring a plate 123 carried by said lock into a position where it will stand just above the forward end of an arm 124 fast on the shaft 90. Previous to the time of adjusting the lock 118 to the third position, as just referred to, it is necessary to give the shaft 90 a slight rocking movement by pressing down on the operating lever 91. This will withdraw the arm 124 from the path of the plate 123 and permit of the adjustment of the latter to its third position. When the lever 91 is then released the return movement of the same together with the shaft 90 under the action of the spring 92 is prevented by reason of the engagement of the arm 124 with the plate 123. When the shaft 90 is rocked, as just described, it will readily be seen that the pins 89 carried thereby will engage the pins 88 carried by the sliding locking plates 84 and draw said plates 84 slightly forward against the tension of the springs 86. When the lock is then adjusted to the third position and the lever 91 is released it will readily be seen that the prevention of return of the shaft 90 to normal position will also prevent the rearward movement of the plate 84 to normal position, and if a key 30 is then depressed in an attempt to operate the machine, it will readily be seen that although the key is free to be depressed it will not be locked in depressed position because of the fact that when the detent member 77 is raised by the depression of the key, the plate 84 will not spring rearwardly to hold the detent in elevated position; consequently when the pressure is removed from the key, its spring 82 will tend to throw it to outer normal position and the detent 77 will drop back to normal position

*Alarm controlling mechanism.*—In Fig. 4 is shown the alarm mechanism which is adapted to give an alarm at each operation of the machine. This alarm mechanism comprises a gong 125 which is adapted to be struck at each operation of the machine by a hammer lever 126 pivoted at 127. The lever 126 is forced to rock about its pivot under the action of a spring 128 which is interposed between a rearwardly extending arm 129 formed on said lever and a standard 130 mounted on the frame of the machine. The hammer 126 is normally held away from the gong 125 by a pin 131 mounted on a disk 132 fast on a shaft 133 which is adapted to be given a single rotation at each operation of the machine in the direction of the arrow. It will be seen that when upon the operation of the machine the shaft 133 is rotated in the direction of the arrow the pin will pass beyond the end of the arm 129 formed on the hammer 126 and consequently the spring 128 will act to throw said hammer lever 126 about its pivot 127 and cause it to strike the gong 125. Upon the completion of the rotation of the shaft 133 and disk 132 the pin 131 will again engage the arm 129 of the lever 126 and rock said lever about the pivot 127 against the tension of the spring 128 thereby withdrawing the hammer 126 from contact with the bell 125.

It is at times desirable to prevent the constant ringing of the bell during rush hours and means are therefore provided for disabling the striking mechanism for the bell, just described. This means comprises a bell crank plate 134 pivoted at 135 to the frame of the machine and having pivoted upon one of its arms a locking pawl 136 which is normally spring drawn to the position shown in Fig. 4. The plate 134 is adapted to be rocked by a lever 137 pivoted at 138 to the frame of the machine and bifurcated at one end to straddle a pin 139 carried by the bell crank 134. The lever 137 has formed at its forward end a flange 1138 in which is formed a slot surrounding a pin 139 carried by the rotary drum of a key lock 140. If it is desired to disable the alarm mechanism it is merely necessary to operate the lock 140 which will rock the lever 137 about its pivot 138 in a counter-clockwise direction, which movement is transmitted to the bell crank plate 134 which is rocked about its pivot 135 in a clockwise direction causing the pawl 136 carried thereby to engage a pin 141 carried by the bell hammer 126. This movement causes a slight rocking movement of said pawl 136 about its pivot. Upon the operation of the machine immediately succeeding this adjustment of the lock 140, the rotation of the disk 132 will cause the pin 131 to give a slight additional rocking movement of the hammer lever 126 about its pivot 127 in a clockwise direction thereby raising the pin 141. When the pin 141 is so raised the pawl 136 will spring back to normal position relative to the bell crank plate 134 thereby causing the upper end of said pawl 136 to pass beneath the pin 141. When the bell hammer lever 126 is then released by the pin 131 passing beyond the end of the arm 129 the lever 126 will spring downward under the action of the spring 128 but the striking of the bell by said lever 126 will be prevented by reason of the engagement of the pin 141 with the upper end of the pawl 136. Upon all subsequent operations it will be seen that the pin 141 will constantly strike against the pawl 136 and the sounding of the alarm will be thereby prevented until the lock 140 is again adjusted to normal position, in which position the pawl 136 will be withdrawn from the path of the pin 141.

*Motor controlling mechanism.*—It is desirable in machines of this type to provide electric motor operating mechanism in order to dispense with the hand operated crank which was formerly employed on machines of this type. The motor mechanism which it is desired to use in connection with the present machine is of a form which is old and well known in the art and shown in Letters Patent to Kettering No. 910,690, issued January 26th, 1909, and reference may be had to the said patent for a detail description of the motor mechanism. By reference to said patent it will be found that the motor is not positively connected to the main drive shaft of the register, but a clutch connection is interposed between the two which clutch is controlled by the special or clerks' keys.

In Fig. 11 is shown an improved form of controlling mechanism which is under the control of the special keys for releasing the machine and clutch simultaneously. The motor mechanism and the direct control of the keys over the clutch does not form a part of the present invention. Improved mechanism, however, is provided as shown in Fig. 11 whereby a second operation of the machine is prevented when one of the controlling keys is held in at the end of a previous operation. It has been found that in practice this is often attempted by persons who attempt to misoperate the machine to cover up adroit manipulations. In these attempts it was customary to press in one of the controlling keys and hold said key depressed so that at the end of the first operation the key could not come out to home position and would thereby hold the circuit for the motor closed, permitting an immediate second operation of the machine to destroy the indication of the first operation immediately. This would prevent the reading of the false indication by the customer or other persons in the store. With the construction shown in Fig. 11 it is rendered necessary to permit of the complete release of the controlling keys and restoration to normal position before a second operation of the machine may be effected.

As hereinbefore stated, when one of the special keys 30 is depressed it will raise its detent member 77 and allow the sliding locking plate 84 to spring rearwardly beneath the lower forward end 83 of the detent member 77 thereby locking the key in depressed position. The movement of the sliding member 84 rearwardly under the action of the spring is employed to release the motor mechanism. As shown in Fig. 11 only a portion of a clutch 142 is shown. This form of clutch has become well known in the art and it is not thought necessary to describe it in detail in the present application. For a detailed description of the same reference may be had to the patent above referred to. In this form of clutch the member 142 is adapted to be given a slight preliminary movement in a clockwise direction about the shaft 143 under the action of a coil spring, not shown, to render the clutch effective. The disk 142 is, however, normally restrained from such movement by the engagement of a flange 144, carried by said disk 142, with a flange 145 formed on one arm of a lever 146 pivoted at 147 to the frame of the machine. The lever 146 also carries a lug 148 which normally engages a shoulder 149 formed on a disk 150 fast on the shaft 48. As will be noted from the train of gearing from the clutch member to the shaft 48, the shafts 133 and 48 are adapted to be given a single rotation at each operation of the machine. Connected to a downwardly extending arm 151 of the lever 146 is a spring 152 which normally tends to rock the lever 146 about its pivot 147 to withdraw the lug 148 from engagement with shoulder 149 of disk 150 and also withdraw the flange 145 from the path of the flange 144 carried by the clutch disk 142 thereby to render the clutch effective and release the motor and permit the operation of the machine. The movement of the lever 146 in this manner is prevented, however, by reason of the engagement of a lug 153, carried by said lever, with a lug 154 carried by a lever 155 pivoted at 156 to the frame of the machine. A downwardly extending arm of the lever 155 is connected by a link 157 to an arm 158 fast on a rock shaft 159. Fast on the rock shaft 159 adjacent the sliding locking plate 84 appropriate to the bank containing the special controlling keys, is an arm 160 pivoted at 161 to the sliding rocking plate 84. When one of the keys is depressed and the sliding locking plate 84 is permitted to spring rearwardly under the action of spring 86, said movement will, through the pivotal connection 161 with the lever 160, rock the shaft 159. The rocking movement of the shaft 159 will, through the medium of the arm 158 and link 157, rock the lever 155 about its pivot 156 to disengage the lug 154, carried by said lever, from the lug 153 formed on the lever 146. As soon as this disengagement is effected, the spring 152 will act to rock the lever 146 about its pivot thereby releasing the operating mechanism as hereinbefore described. Upon the operation of the machine, when the shafts 133 and 48 are given a single rotation a pin 160 carried by the gear 161 fast on the shaft 133 will engage a flange 162 carried by rearward extending arm of the lever 146 thereby rocking the lever about its pivot 147 against the tension of the spring 152 and back to normal locking position. At this time in the operation of the machine the keys will have been released and the sliding locking member 84 moved back to normal forward position against the tension of the spring 86. When the sliding member 84 is so moved forwardly it will rock the shaft 159 in a counter-clockwise direction through the medium of the connections hereinabove described. The rocking movement of the shaft 159 will tend to restore the lever 155 to normal position to again bring the lug 154 carried thereby in the path of the lug 153 formed on the lever 146, thereby preparing the machine for the second operation.

Fast on the shaft 159 is an arm 163 which is pivotally connected at its upper end to the slide 164 slotted and surrounding a pin 166 carried by an upwardly extending arm 167 formed on the lever 91 hereinbefore referred to. The slide 164 is formed with a bevel lug 168 which normally engages the pin 169 carried by a lever 170 pivoted at 171 to the frame of the machine. At its rear end the lever 170 is formed with a shoulder 172 which is adapted to engage a lug 173 carried by the downward extending arm of the lever 146. Such engagement, however, is prevented by reason of the normal engagement of the bevel lug 168 of the pin 169 at the forward end of the lever 170. A spring 174 tends normally to rock the lever 170 to cause the shoulder 175 to engage the lug 173. When a key is depressed as hereinbefore stated, and the slide 84 moves rearwardly to rock the shaft 159, the slide 164 will be drawn rearwardly through its connections with the shaft 159 thereby withdrawing the bevel lug 168 from engagement with the pin 169, to permit the lever 170 to rock about its pivot 171. The movement of the parts are so timed, however, that this rocking movement of the lever 170 is not permitted until after the lever 155 has been rocked to release the lever 146. By this time the lug 173 will have rocked above the shoulder 175 thereby preventing a full rocking movement of the lever 170 under the action of its spring 174. If the machine is then permitted to operate and the key 30 is held depressed at the end of the operation, it will readily be seen that this will retain the detent member 77 in elevated position and the slide 84 will remain in its rearmost position. This will continue the disengagement of the bevel lug 168 and pin 169 and consequently under the action of the spring 174 the shoulder 175 will be held in engagement with the lug 173. At the end of the operation, however, the pin 160 carried by the disk 161 will engage the flange 162 carried by the lever 146 and thereby move lever 146 to a position slightly beyond its normal position. When the lever 146 is so moved the lug 173 will be moved beyond the shoulder 175 thereby releasing the lever 170 and permitting the same to rock about its pivot under the action of the spring 174 to cause the shoulder 175 to rock up in front of the lug 173. This engagement of the shoulder and lug will prevent the movement of the lever 146 under the action of its spring 152 again to release the machine although the lug 154 is held out of engagement with the lug 153 by reason of the previously depressed key being held in depressed position. It will therefore readily be seen that it will be necessary to release the depressed key before another operation of the machine may be effected. The release of the depressed key, it will be remembered, may be effected by the depression of the lever 91. This will, as hereinbefore stated, effect the rocking movement of the shaft 90 and, through the medium of the pin 89 carried thereby and the pin 88 appropriate to the slide 84 of the special key bank, draw said plate 84 forwardly to permit the detent member 75 to drop down and release the depressed key. This forward movement of the plate 84 will, through the medium of the shaft 159 and its connections, again rock the plate 155 back to normal position to bring the lug 154 carried thereby into the path of the lug 153 formed on the lever 146. When the shaft 159 is rocked to permit the operation just described, it will also cause the slide 164 to move forwardly through the medium of its connection with the arm 163 which, it will be remembered, is fast on the shaft 159. When the slide 164 is so moved forwardly, the bevel lug 168 carried thereby will engage the pin 169 carried by the lever 170. Thus engagement of the lug 168 and pin 169 will rock the lever 170 to an extent sufficient to disengage the notch 172 from the lug 173, thereby permitting the lever 146 to move a slight distance under the impulse of its spring 152 to cause the lug 153 to strike against the lug 154. The parts are then in a position to permit of a second complete operation of the machine if it is so desired. Thus it will readily be seen that the improvements embodied in the present invention tend greatly to improve the type of machine to which they have been applied. By their application to this type of machine they have overcome many objectionable points which were matters of considerable importance in the practical employment of the machine in the performance of its intended functions.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a cash register, the combination with a plurality of totalizers, of actuating mechanism common to all of the totalizers, means for preliminarily establishing a coöperative relation between the actuating mechanism and any desired one of the totalizers, and means effective upon an operation of the machine for lifting the positioned totalizer into operative engagement with the actuating mechanism, said latter means comprising a sliding frame carrying the totalizers, a sliding plate adjacent the frame, a slot and pin connection intermediate the plate and frame whereby the movements of the former are transmitted to the latter, and a cam for operating said plate.

2. In a cash register, the combination with actuating mechanism differentially operable according to the amount to be registered, of a plurality of totalizers, a carrier for said totalizers adjustable to establish a coöperative relation between any desired one of the totalizers and the actuating mechanism, a support for said carrier movable to move the positioned totalizer into and out of operative engagement with the actuating mechanism, connections normally acting to move said support at each operation of the machine said connections comprising a rotary disk carrying a cam plate having two operating faces one concentric and the other eccentric to the axis of rotation of said disk, said faces merging into each other, a sliding plate adjacent the frame and adapted to be slid by the cam plate, and a slot and pin connection intermediate said plate and frame.

3. In a cash register, the combination with actuating mechanism differentially operable according to the amount to be registered, of a plurality of totalizers, a carrier for said totalizers adjustable to establish a coöperative relation between any desired one of the totalizers and the actuating mechanism, a support for said carrier movable to move the positioned totalizer into and out of operative engagement with the actuating mechanism, connections normally acting to move said support at each operation of the machine said connections comprising a rotary disk carrying a cam plate having two operating faces one concentric and the other eccentric to the axis of rotation of said disk, said faces merging into each other, a sliding plate adjacent the frame and adapted to be slid by the cam plate, a slot and pin connection intermediate said plate and frame, and manipulative devices for effecting a movement of said plate out of coöperative relation with the eccentric face of said cam plate whereby no movement of the totalizer frame will be effected upon an operation of the rotary disk.

4. In a cash register, the combination with a main operating mechanism, of a series of depressible keys, a detent mechanism for said keys, a latch for the main operating mechanism controlled by the detent mechanism, a cash receptacle adapted to be exposed at each operation of the machine, and means controlled by the receptacle for preventing movement of the detent and latch while the receptacle is in exposed position.

5. In a cash register, the combination with a main operating mechanism, of a series of depressible keys, a detent mechanism for said keys, a latch for the main operating mechanism controlled by the detent mechanism, a cash receptacle adapted to be exposed at each operation of the machine, means controlled by the receptacle for preventing movement of the detent and latch while the receptacle is in exposed position, and adjustable means capable of a plurality of adjustments, one adjustment in which said receptacle controlled means is ineffective, a second adjustment in which said means is effective, and a third adjustment in which said detent mechanism is completely disabled.

6. In a cash register, the combination with an alarm mechanism comprising a bell and a hammer operable at each operation of the machine to strike said bell, and means for obstructing said hammer to prevent striking at will, and means comprising a key operated lock, a pivoted lever controlled by said lock, a rocking plate operated by the lever, a spring drawn pawl carried by the plate and a pin carried by the hammer under which pin the pawl is adapted to pass upon an operation of the machine immediately following an operation of said lock to prevent an alarm.

7. In a cash register, the combination with a series of keys having beveled inner ends, of a detent having lateral projections with which the beveled ends of the keys coöperate and thereby move said detent, the relative positions of the beveled ends of the keys and the projections of the detent being such that during the entire depression of any one of said keys its beveled end will engage with its corresponding detent projection whereby an even pressure of the key is attained, means for retaining the detent in its moved position, and a recess formed in each key which recess when a key is operated receives the lug adjacent to the one being acted upon by the depressed key whereby said key is held in its depressed position.

8. In a cash register, the combination with a pivoted plate, of lugs having cut away portions projecting from the outer edge of said plate, a series of keys having beveled inner ends coöperating with the lugs and thereby rocking said plate, the inner ends of the keys normally being within the arc of a circle described by the lugs when the plate is rocked by the operation of any of the keys, means for retaining the plate in its rocked position, and a recess formed in each key, which recess when a key is operated receives the lug adjacent to the one being acted upon by the depressed key whereby said key is held in its depressed position, the cut out portions of the lugs permitting movement of the plate carrying said lugs without interfering with the unoperated keys.

In testimony whereof I affix my signature in the presence of two witnesses.

WILLIAM G. CHAMBERS.

Witnesses:
J. BYRON RICKETTS,
CARL BEUST.